(12) United States Patent
Lapsa et al.

(10) Patent No.: US 12,510,337 B2
(45) Date of Patent: Dec. 30, 2025

(54) ACTIVELY-COOLED HEAT SHIELD SYSTEM AND VEHICLE INCLUDING THE SAME

(71) Applicant: STOKE Space Technologies, Inc., Kent, WA (US)

(72) Inventors: Andrew Lapsa, Seattle, WA (US); Thomas Feldman, Kent, WA (US)

( * ) Notice: Subject to any disclaimer, the term of this patent is extended or adjusted under 35 U.S.C. 154(b) by 280 days.

(21) Appl. No.: 17/756,548

(22) PCT Filed: Aug. 27, 2020

(86) PCT No.: PCT/US2020/048226
§ 371 (c)(1),
(2) Date: May 26, 2022

(87) PCT Pub. No.: WO2021/112934
PCT Pub. Date: Jun. 10, 2021

(65) Prior Publication Data
US 2022/0412709 A1    Dec. 29, 2022

Related U.S. Application Data

(60) Provisional application No. 62/942,886, filed on Dec. 3, 2019.

(51) Int. Cl.
*F42B 15/34*    (2006.01)
(52) U.S. Cl.
CPC .................... *F42B 15/34* (2013.01)
(58) Field of Classification Search
CPC .................................................... F42B 15/34
See application file for complete search history.

(56) References Cited

U.S. PATENT DOCUMENTS 3,093,346 A    6/1963    Faget et al.
D201,773 S    7/1965    Bono
(Continued)

FOREIGN PATENT DOCUMENTS

CN    102828851 A    12/2012
CN    209637832 U  *  11/2019
(Continued)

OTHER PUBLICATIONS

Karita et al., Airframe Cooling Cycle, Jun. 28, 1989, JPH01164700A, Whole Document (Year: 1989).*

(Continued)

*Primary Examiner* — Larry L Furdge
(74) *Attorney, Agent, or Firm* — Patrick D. Duplessis

(57) ABSTRACT

An actively-cooled heat shield system includes a heat shield, a tank, a pump, a heat exchanger, and a turbine. The heat shield defines a windward side of a vehicle. The tank stores a coolant. The pump receives the coolant from the tank and outputs a pressurized coolant. The heat exchanger is integrally connected with the heat shield. The heat exchanger receives the pressurized coolant from the pump, transfers heat from the heat shield to the pressurized coolant to generate a heated fluid, and outputs the heated fluid. The turbine includes an inlet, a shaft, and an outlet. The inlet receives the heated fluid output from the heat exchanger. The shaft is coupled to the pump and includes turbine blades. The shaft rotates and powers the pump when the heated fluid received from the heat exchanger acts on the turbine blades. The outlet outputs the heated fluid.

20 Claims, 2 Drawing Sheets

(56) References Cited

U.S. PATENT DOCUMENTS

| | | | |
|---|---|---|---|
| 3,270,501 A | 9/1966 | Webb | |
| 3,295,790 A | 1/1967 | Bono | |
| 3,780,968 A | 12/1973 | Parilla | |
| 3,888,419 A | 6/1975 | McCullough | |
| 3,929,289 A | 12/1975 | Kardon et al. | |
| 4,273,304 A * | 6/1981 | Frosch | B64C 1/40 60/730 |
| 4,605,184 A | 8/1986 | Kim | |
| 4,802,629 A | 2/1989 | Klees | |
| 5,201,832 A | 4/1993 | Porter | |
| 5,463,866 A | 11/1995 | Klees | |
| 5,568,901 A * | 10/1996 | Stiennon | B64G 1/403 244/171.3 |
| 6,059,235 A | 5/2000 | Meissinger et al. | |
| 6,119,985 A * | 9/2000 | Clapp | B64G 1/005 244/135 R |
| 6,213,431 B1 | 4/2001 | Janeke | |
| 6,516,605 B1 | 2/2003 | Meholic | |
| 6,964,154 B1 | 11/2005 | Sackheim et al. | |
| 7,431,242 B1 | 10/2008 | Brown et al. | |
| 10,773,834 B2 | 9/2020 | Mbamalu | |
| 2005/0017132 A1 | 1/2005 | Janeke | |
| 2005/0188677 A1 | 9/2005 | Nyberg et al. | |
| 2006/0145020 A1* | 7/2006 | Buehler | B64G 1/58 244/171.8 |
| 2006/0219846 A1 | 10/2006 | Johnson et al. | |
| 2007/0012820 A1 | 1/2007 | Buehler | |
| 2009/0145134 A1 | 6/2009 | Vuillamy et al. | |
| 2012/0023893 A1 | 2/2012 | Yoo et al. | |
| 2012/0312927 A1 | 12/2012 | Morris et al. | |
| 2013/0160472 A1* | 6/2013 | Klimpel | B64D 13/08 62/401 |
| 2015/0285187 A1 | 10/2015 | Sannino et al. | |
| 2017/0138310 A1 | 5/2017 | Villarreal et al. | |
| 2018/0057191 A1* | 3/2018 | Zhang | F42B 10/40 |
| 2019/0003423 A1 | 1/2019 | Pelfrey | |
| 2019/0009933 A1 | 1/2019 | Mbamalu | |
| 2019/0257245 A1 | 8/2019 | Duge et al. | |
| 2020/0049103 A1 | 2/2020 | Craddock | |

FOREIGN PATENT DOCUMENTS

| | | | |
|---|---|---|---|
| FR | 2542698 A1 | | 9/1984 |
| JP | H01164700 A | * | 6/1989 |
| JP | H-10-503731 A | | 4/1998 |
| JP | 2016-500789 A | | 1/2016 |

OTHER PUBLICATIONS

Yang et al., Airplane Heat Recovery Power Generation Device, Nov. 15, 2019, CN209637832U, Whole Document (Year: 2019).*

Karita et al., AirFrame Cooling Cycle, Jun. 28, 1989, JPH01164700, Whole Document (Year: 1989).*

Koelle D E: "Entwicklungstendenzen Bei Raumtransport-Systemen", Zeitschrift Fur Flugwissenschaften Und Weltraumforschung, DFVLR. Koln, DE, vol. 16, No. 2, Apr. 1, 1992(Apr. 1, 1992), pp. 67-76, XP000268629, ISSN: 0342-068X.

Thornton E A: "Thermal Structures: Four Decades of Progress", Journal of Aircraft, AIAA—American Institute of Aeronautics and Astronautics, Inc, US, vol. 29, No. 3, May 1, 1992 (May 1, 1992), pp. 485 498, XP000274400, ISSN: 0021-8669.

G. Hanley and R. Bergeron. "An overview of the Satellite Power System—Transportation system," AIAA 1978-975. 14th Joint Propulsion Conference. Jul. 1978.

Bono, Phil. "The Case for Ballistic Recovery of Boosters." SAE Transactions, vol. 76, 1968, pp. 1479-1494. JSTOR, http://www.jstor.org/stable/44565034. Accessed Oct. 31, 2023.

Christopher J. Cohan, Walter B. Olstad, Donald W. Patterson, and Robert Salkeld, Space Transportation Systems 1980-2000, Publisher: American Institute of Aeronautics and Astronautics (Jan. 1, 1978), 91 pages, ISBN 0-915928-27-2.

Wang, Ten-See. "Analysis of Linear Aerospike Plume-Induced X-33 Base-Heating Environment." Journal of Spacecraft and Rockets 36 (1998): 777-783.

Campbell, J., Jr. and Cobb, S. M., Aerospike Thrust Chamber Program—Final Report, Rockwell International Corp. Canoga Park, CA, United States, Published Dec. 1, 1976, Report/Patent No. NASA-CR-135169/R76-189, Accession No. 77N21189: Funding Number(s): Contract_Grant: NAS3-20076, 154 pages.

Advanced Aerodynamic Spike Configurations, Technical Report, Rocketdyne Canoga Park CA Canoga Park , Silver,Roy, Nov. 1, 1966 AccessionNo. AD0378296, 411 pages.

Bono, P., "The Case for Ballistic Recovery of Boosters," SAE Technical Paper 670382, 1967, https://doi.org/10.4271/670382, 17 pages.

G. Esnault and F. Rossi, "Design and CFD Analysis of the LOX/LCH4 Dual Regenerative Cooling Circuit of the DEMOP1 Demonstrator," Pangea Aerospace, Calle Roc Boronat, 117, 08018 Barcelona, Spain.

Hefner, J.N., & Keyes, J.W. (1967). Effect of forward-facing jets on aerodynamic characteristics of blunt configurations at Mach 6. Journal of Spacecraft and Rockets, 4, 533-534.

Simmons, J. R. (2014). Design and Evaluation of Dual-Expander Aerospike nozzle Upper Stage Engine.

NASA Technology Roadmaps, TA 9: Entry, Descent, and Landing Systems, Jul. 2015, 125 pages.

The M-1 Rocket Engine, Technical Report, Aeroject-General Corporation under Contract NAS 3-2555, 29 pages.

Charczenko, N., Hennessey, K. W., & United States. (1961). Investigation of a retrorocket exhausting from the nose of a blunt body into a supersonic free stream. Washington, D.C: National Aeronautics and Space Administration.

Romeo, D. J., Sterrett, J. R., United States., & Langley Research Center. (1963). Exploratory investigation of the effect of a forward-facing jet on the bow shock of a blunt body in a Mach No. 6 free stream. Washington, D.C: National Aeronautics and Space Administration.

Hall, Joshua N., "Optimized Dual Expander Aerospike Rocket" (2011). Theses and Dissertations. 1326. https://scholar.afit.edu/etd/1326.

Berman, K. and Crimp, F.W., Jr. Performance of Plug-Type Rocket Exhaust Nozzles, ARS Journal, Jan. 1961, pp. 18-23.

Onofri, M., Calabro, M.J., Hagemann, G.S., Immich, H., Sacher, P.W., Nasuti, F., & Reijasse, P. (2006). Plug Nozzles: Summary of Flow Features and Engine Performance.

Rao, G.V. (1961). Recent Developments in Rocket Nozzle Configurations. ARS Journal, 31, 1488-1494.

Aukerman, C.A. (1991). Plug nozzles: The ultimate customer driven propulsion system.

Rogers A (2023) Spacecraft Recycling: Unveiling the Potential of Reusable Rocket Technology. Adv Automob Eng. 12:225.

Scarborough, R. (1964). Recovery and Reuse of a Two Stage Launch Vehicle.

Danielson, T. (2017). Vehicle Integrated Aerospike for High Mass Mars Missions.

Korzun, A.M. (2008). Supersonic Retropropulsion Technology for Application to High Mass Mars Entry , Descent , and Landing.

International Search Report and Written Opinion of the International Searching Authority; Application No. PCT/US20/48226; Completed: Nov. 12, 2020; Mailing Date: Dec. 15, 2020; 9 Pages.

International Search Report and Written Opinion of the International Searching Authority; Application No. PCT/US2022/071686; Completed: Nov. 1, 2022; Mailing Date: Nov. 21, 2022; 7 Pages.

International Search Report and Written Opinion of the International Searching Authority; Application No. PCT/US22/71688; Completed: Nov. 18, 2022; Mailing Date: Dec. 13, 2022; 6 Pages.

Wasko, Robert A.; "Performance of Annular Plug and Expansion-Deflection Nozzles Including External Flow Effects at Transonic Mach Numbers"; NASA Technical Note D-4462; Apr. 1968; 36 Pages [retrieved on Mar. 21, 2023]. Retrieved from the Internet: <https://ntrs.nasa.gov/api/citations/19680010861/downloads/19680010861.pdf>.

Mueller, Thomas J., et al.; "Analytical and Experimental Study of Axisymmetric Truncated Plug Nozzle Flow Fields"; Final Report

(56) References Cited

OTHER PUBLICATIONS

TN-601-FR-10; Prepared by University of Notre Dame for NASA; Sep. 1972; 134 Pages [retrieved on Mar. 21, 2023]. Retrieved from the Internet: <https://ntrs.nasa.gov/api/citations/19730003555/downloads/19730003555.pdf>.

Stitt, Leonard E.; "Exhaust Nozzles for Propulsion Systems With Emphasis on Supersonic Cruise Aircraft"; NASA Reference Publication 1235; May 1990; 107 Pages [retrieved on Mar. 21, 2023]. Retrieved from the Internet: <https://ntrs.nasa.gov/citations/19900011721>.

Aukerman, Carl A.; "Plug Nozzles—The Ultimate Customer Driven Propulsion System"; NASA Contractor Report 187169; AIAA-91-2208; Aug. 1991; 27 Pages [retrieved on Mar. 21, 2023]. Retrieved from the Internet: <https://ntrs.nasa.gov/citations/19920013861>.

Bradley, Linda L.; "Descriptive Finding Guide for Philip Bono Personal Papers"; Jul. 8, 2016 [retrieved on Mar. 21, 2023]. Retrieved from the Internet: <https://sandiegoairandspace.org/files/Bono,_Philip-FG-SC.10166.doc>.

"Bono, Philip," Web page <http://www.astronautix.com/b/bono.html>, 6 pages [retrieved on Mar. 20, 2023].

"Hyperion SSTO," Web page <http://www.astronautix.com/h/hyperionssto.html>, 3 pages [retrieved on Mar. 20, 2023].

"Ithacus," Web page <http://www.astronautix.com/i/ithacus.html>, 3 pages [retrieved on Mar. 20, 2023].

"Pegasus VTOVL," Web page <http://www.astronautix.com/p/pegasusvtovl.html>, 4 pages [retrieved on Mar. 20, 2023].

"Project Selena," Web page <http://www.astronautix.com/p/projectselena.html>, 3 pages [retrieved on Mar. 20, 2023].

"Rombus," Web page <http://www.astronautix.com/r/rombus.html>, 4 pages [retrieved on Mar. 20, 2023].

"SASSTO," Web page <http://www.astronautix.com/s/sassto.html>, 5 pages [retrieved on Mar. 20, 2023].

"Philip Bono Personal Papers," Web page <https://sandiegoairandspace.org/collection/item/philip-bono-personal-papers>, 5 pages [retrieved on Mar. 21, 2023].

Bono, et al.; Frontiers of Space: The Pocket Encyclopedia of Spaceflight in Color (London, Blandford Press, 1969), pp. 64-66, 68-72, 78, 147-163, 171, 180, 206-207, 246-247. ISBN 0-7137-3504-X.

Select photos from Flickr album entitled "Philip Bono Collection Image," uploaded Jun. 20, 2016 by user "SDASM Archives" [retrieved on Mar. 21, 2023]. Retrieved from Internet: <https://www.flickr.com/photos/sdasmarchives/albums/72157669057850210>.

Automated transcript from YouTube video entitled "How Stoke Space's Unique Rocket Works // Exclusive Tour & Interview," 21 pages, uploaded on Feb. 4, 2023 by user "Everyday Astronaut". Retrieved from Internet: <https://www.youtube.com/watch?v=EY8nbSwjtEY&t=735s>.

Automated transcript from YouTube video entitled "We are Stoke Space", 2 pages, uploaded on Dec. 17, 2022 by user "Stoke Space". Retreived from Internet: <https://www.youtube.com/watch?v=VzqhZLgpiv0&t=46s>.

Barber, T., Maicke, B., & Majdalani, J. (2009) Current State of High Speed Propulsion: Gaps, Obstacles and Technological Challenges in Hypersonic Applications, 45th AIAA/ASME/SAE/ASEE Joint Propulsion Conf. and Exhibit, 2009-5118, AIAA, Denver, CO, pp. 1-28.

McConarty, W. A., & Anthony, F. M. (1971) Design and Evaluation of Active Cooling Systems for Mach 6 Cruise Vehicle Wings, NASA-CR-1916, National Aeronautics & Space Administration, Washington, D.C., 267 pages.

Kanda, T. Masuya, G., & Wakamatsu, Y., Chinzei, N., & Kanmuri, A. (1989) A Comparison of Scramjet Engine Performances of Various Cycles, 25th AIAA/ASME/SAE/ASEE Joint Propulsion Conf. and Exhibit, 1989-2676, AIAA, Monterey, CA, pp. 1-9.

Kanda, T., Masuya, G., & Wakamatsu, Y. (1991) Propellant Feed System of a Regeneratively Cooled Scramjet, Journal of Propulsion and Power, vol. 7, No. 2, pp. 299-301.

Kanda, T., Masuya, G., Wakamatsu, Y., Chinzei, N., & Kanmuri, A. (1991) Parametric Study of Airframe-integrated Scramjet Cooling Requirement, Journal of Propulsion and Power, vol. 7, No. 3, pp. 431-436.

Alario, J. (1979) Design, Fabrication, and Test of a Hydrogen Heat Pipe, NASA-CR-152267, National Aeronautics & Space Administration, Washington, D.C., 77 pages.

\* cited by examiner

ACTIVELY-COOLED HEAT SHIELD SYSTEM AND VEHICLE INCLUDING THE SAME

CROSS-REFERENCE TO RELATED APPLICATION

This application claims priority to U.S. Provisional Patent Application No. 62/942,886, filed on Dec. 3, 2019, the contents of which are incorporated by reference herein in their entirety.

TECHNICAL FIELD

The present disclosure generally relates to cooling systems for vehicles that are subjected to high levels of heating. The present disclosure more particularly relates to actively-cooled heat shield systems for use in rockets and other vehicles that travel at or above hypersonic speeds, such as space re-entry vehicles, aircraft, and missiles.

BACKGROUND

Aircraft-like reusability for rockets has long been the "holy grail" of rocketry due to the potential for huge cost benefits. The ability to recover and reuse an upper stage rocket of a multi-stage rocket system (e.g., the second stage rocket of a two-stage rocket system) remains a significant technical gap that has not yet been solved by the industry. Reusing the upper stage of a multi-stage rocket is challenging due to the harsh re-entry environment and the performance penalties associated with increased structural mass required for robust reuse. Upper stage rockets are typically constructed with the minimum structure and complexity since any mass addition to the second stage is a 1:1 reduction in payload capacity. Reusing an upper stage rocket therefore requires significant additional functionality but with minimal mass addition.

Rockets and other vehicles that travel at or above hypersonic speeds (e.g., space re-entry vehicles, aircraft, missiles, etc.) require a means to protect themselves from the heating that occurs at such high speeds. Conventional solutions for mitigating such heating include use of one or more of the following: (i) ablative materials, which undergo pyrolysis and generate gases that move downstream in a boundary layer to form a protective film layer; (ii) high-temperature materials (e.g., ceramics, carbon-carbon, etc.); (iii) composite materials, which insulate a base material and radiate heat away therefrom; and (iv) transpiration cooling, which involves use of a thin protective film that is provided by a gas passing through a semi-porous wall.

Existing heat management solutions have cost, operations, and/or mass impacts that may not trade favorably in certain applications, such as reusable vehicles. For example, ablative materials and fragile ceramics are incompatible with a highly reusable system. Transpiration cooling of a heat shield is costly and difficult to control. What is needed is a cooling system that is highly robust, highly controllable, and well suited for long term reusability.

Aspects of the present invention are directed to these and other problems.

SUMMARY

According to an aspect of the present invention, an actively-cooled heat shield system includes a heat shield, a tank, a pump, a heat exchanger, and a turbine. The heat shield defines a windward side of a vehicle. The tank is onboard the vehicle and is configured to store a coolant. The pump is onboard the vehicle and is configured to receive the coolant from the tank and output a pressurized coolant. The heat exchanger is onboard the vehicle and is integrally connected with the heat shield. The heat exchanger is configured to receive the pressurized coolant from the pump, transfer heat from the heat shield to the pressurized coolant to generate a heated fluid, and output the heated fluid. The turbine is onboard the vehicle and includes an inlet, a shaft, and an outlet. The inlet is configured to receive the heated fluid output from the heat exchanger. The shaft is coupled to the pump and includes turbine blades mounted thereon. The shaft is configured to rotate and thereby power the pump when the heated fluid received from the heat exchanger acts on the turbine blades. The outlet is configured to output the heated fluid.

According to another aspect of the present invention, a vehicle includes an actively-cooled heat shield system. The heat shield system includes a heat shield, a tank, a pump, a heat exchanger, and a turbine. The heat shield defines a windward side of a vehicle. The tank is onboard the vehicle and is configured to store a coolant. The pump is onboard the vehicle and is configured to receive the coolant from the tank and output a pressurized coolant. The heat exchanger is onboard the vehicle and is integrally connected with the heat shield. The heat exchanger is configured to receive the pressurized coolant from the pump, transfer heat from the heat shield to the pressurized coolant to generate a heated fluid, and output the heated fluid. The turbine is onboard the vehicle and includes an inlet, a shaft, and an outlet. The inlet is configured to receive the heated fluid output from the heat exchanger. The shaft is coupled to the pump and includes turbine blades mounted thereon. The shaft is configured to rotate and thereby power the pump when the heated fluid received from the heat exchanger acts on the turbine blades. The outlet is configured to output the heated fluid.

According to another aspect of the present invention, a re-usable upper stage rocket of a multi-stage rocket system includes an actively-cooled heat shield system that converts heat from a high Mach number flow environment into energy to drive a liquid coolant pump.

According to another aspect of the present invention, a method for actively cooling a windward side of an upper stage rocket of a multi-stage rocket system during atmospheric re-entry includes the steps of: initiating driving of a pump onboard the upper stage rocket to initiate output of a pressurized coolant from the pump; flowing the pressurized coolant output by the pump through a heat exchanger integrally connected with a heat shield that defines at least a portion of the windward side of the upper stage rocket; transferring heat from the heat shield to the pressurized coolant to generate a heated fluid; inputting the heated fluid to a turbine onboard the upper stage rocket, the turbine including a shaft coupled to the pump and turbine blades mounted to the shaft; and exposing the turbine blades to the heated fluid to drive the shaft and thereby continue driving the pump.

In addition to, or as an alternative to, one or more of the features described above, further aspects of the present invention can include one or more of the following features, individually or in combination:

- at least the heat exchanger, the turbine, and the pump are configured such that, once operation of the pump is started, an amount of energy supplied to the turbine from the heat exchanger is alone sufficient to continue operation of the pump;

the heat shield system is configured such that, once operation is started, an amount of energy transferred to the coolant by the heat exchanger is at least sufficient to sustain operation;

the heat shield, the tank, the pump, the heat exchanger, and the turbine are configured such that an amount of energy transferred to the coolant by the heat exchanger is at least sufficient to sustain operation of the heat shield system;

the heat shield, the tank, the pump, the heat exchanger, and the turbine are configured such that an amount of energy transferred to the coolant by the heat exchanger is at least sufficient to supply the turbine with an amount of power required to drive the pump;

the coolant is at least one of an active coolant, a liquid coolant, and a cryogenic coolant;

the heated fluid is at least one of a gas and a supercritical fluid;

the heat shield system further includes a primary heated fluid conduit configured to transfer the heated fluid from the heat exchanger to the inlet of the turbine, and a bypass conduit configured to bypass, from at least a portion of the primary heated fluid conduit, an excess of energy in the heated fluid for power use by an auxiliary system;

a pressure of the coolant in the tank alone provides energy sufficient to start spinning the turbine and the pump, creating an increasing pressure and increasing power available to the turbine;

the heat exchanger and the heat shield are configured such that flow of the coolant through the heat exchanger maintains acceptable temperatures on the heat shield while the vehicle re-enters a planetary atmosphere;

the heat shield is configured to be exposed to a high Mach number flow environment during normal operation;

the vehicle is an upper stage rocket of a multi-stage rocket system;

the upper stage rocket includes a propulsion engine disposed at an aft end thereof, and the aft end defines the windward side of the upper stage rocket during operation of the heat shield system;

the heat shield system and the propulsion engine share a multi-purpose component, and the multi-purpose component is at least one of the heat shield, the tank, the pump, the heat exchanger, and the turbine;

the pump of the heat shield system is a fuel pump of the propulsion engine;

the vehicle further includes an exhaust conduit through which at least a portion of the heated fluid output from the turbine exits the upper stage rocket; and the transferring and inputting steps of the method supply an amount of energy to the turbine that is alone sufficient to continue driving the pump.

These and other aspects of the present invention will become apparent in light of the drawings and detailed description provided below.

DETAILED DESCRIPTION

Figure 1:
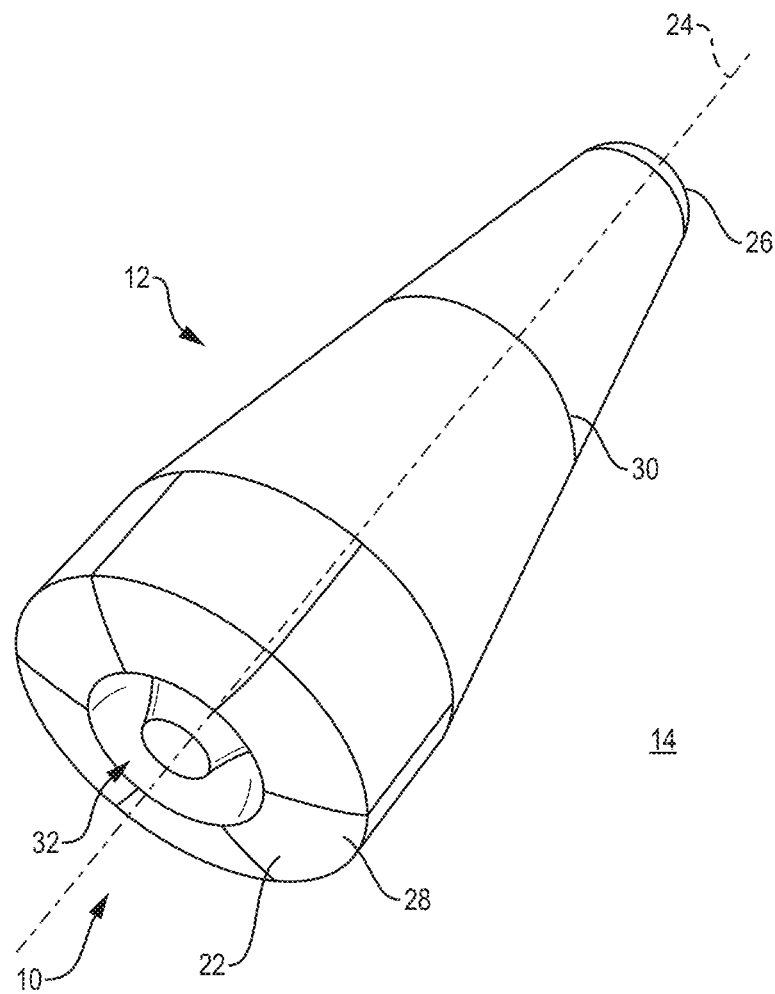
FIG. 1 is a perspective view of a vehicle including the present heat shield system.
Figure 2:
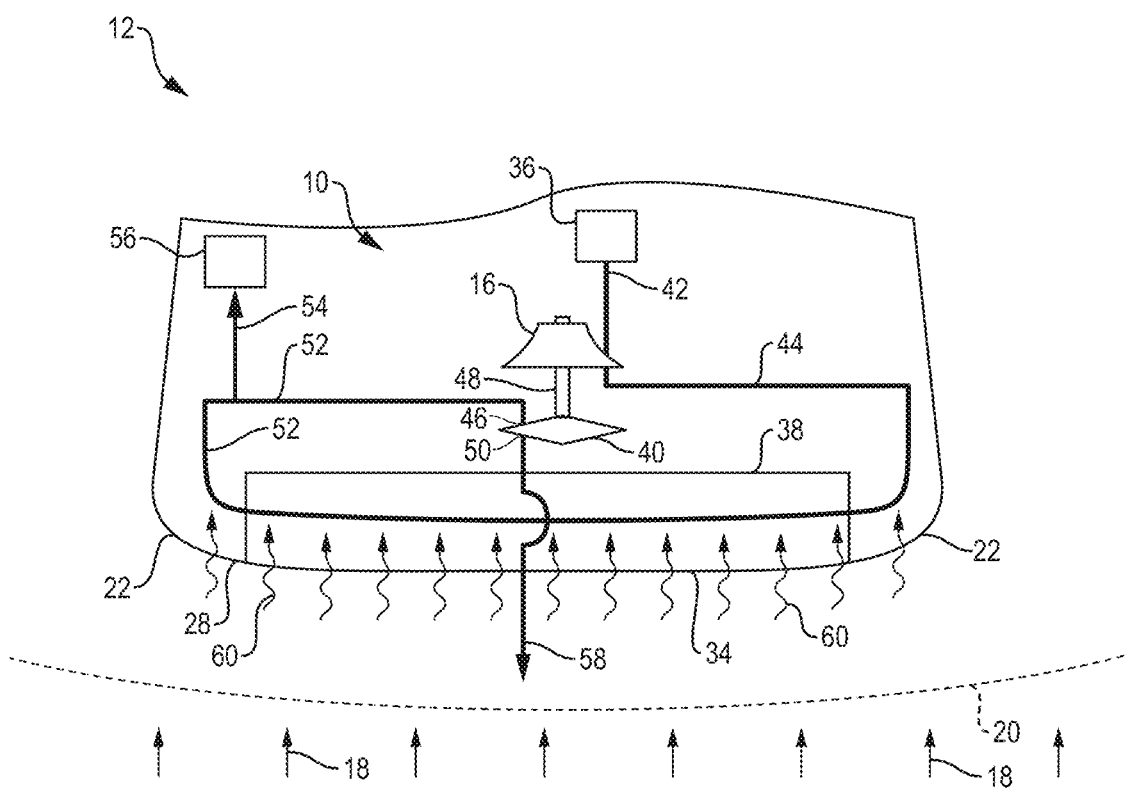
FIG. 2 is a schematic sectional view of an aft end portion of the vehicle of FIG. 1 showing components of the heat shield system.

Referring to FIGS. 1 and 2, the present disclosure describes an actively-cooled heat shield system 10 and a vehicle 12 including the same. The heat shield system 10 converts heat from a high Mach number flow environment 14 into energy to drive a liquid coolant pump 16 (see FIG. 2).

Referring to FIG. 1, the vehicle 12 is a rocket (e.g., a multi-stage rocket, a single-stage-to-orbit (SSTO) rocket, an upper stage rocket, a booster rocket, etc.), a missile, a spacecraft, an aircraft, or another vehicle designed for travel (e.g., flight) up to at least supersonic speeds (e.g., supersonic speeds, hypersonic speeds, re-entry speeds, etc.) in atmospheric, sub-orbital, orbital, extraterrestrial, and/or outer space environments.

In the illustrated embodiment, the vehicle 12 is a second stage rocket of a two-stage rocket system (not shown). The vehicle 12 (hereinafter the "second stage rocket 12") extends along a centerline 24 between a forward end 26 and an opposing aft end 28 thereof. The second stage rocket 12 includes a payload 30 toward the forward end 26, and an engine 32 toward the aft end 28. The aft end 28 defines the windward side 22 of the second stage rocket 12. In the illustrated embodiment, the engine 32 is an augmented aerospike nozzle engine as disclosed in U.S. Provisional Patent Application No. 62/941,383, filed Nov. 27, 2019 by the same inventors, and in the International Patent application claiming priority to U.S. Provisional Patent Application No. 62/941,383, the contents of which are incorporated herein by reference in their entirety. In other embodiments, the engine 32 is a bell nozzle engine or another type of rocket engine, or the vehicle may not include an engine at all.

Referring to FIG. 2, during use the second stage rocket 12 moves through an environment 14 (e.g., the atmosphere, space) at freestream Mach numbers 18 that can approach Mach thirty (30) for space re-entry vehicles. A bow shock 20 is formed upstream of the second stage rocket 12, and temperature on the vehicle side of the bow shock 20 can reach thousands of degrees Kelvin. The windward side 22 of the second stage rocket 12 is exposed to these high temperatures and therefore cooling and/or other thermal protection is necessary for reusability.

The actively-cooled heat shield system 10 includes a heat shield 34, a tank 36, a pump 16, a heat exchanger 38, and a turbine 40.

The heat shield 34 defines an outer surface of the windward side 22 of the second stage rocket 12.

The tank 36 is onboard the second stage rocket 12 and stores a coolant (e.g., an active coolant, a liquid coolant, a cryogenic coolant, etc.).

The pump 16 is onboard the second stage rocket 12 and receives the coolant from the tank 36. The pump 16 outputs a pressurized coolant (e.g., a coolant having a pressure of several hundred psi or higher). That is, the pressure of the coolant is greater after it passes through the pump 16 than it is when stored in the tank 36. The coolant is transferred from the tank 36 to the pump 16 via a coolant conduit 42 (e.g., ducting, tubing, etc.).

The heat exchanger 38 is onboard the second stage rocket 12 and is integrally connected with the heat shield 34. The heat exchanger 38 receives the pressurized coolant from the pump 16, transfers heat from the heat shield 34 to the pressurized coolant to generate a heated fluid (e.g., a gas, a supercritical fluid, etc.), and outputs the heated fluid. The pressurized coolant is transferred from the pump 16 to the heat exchanger 38 via a pressurized coolant conduit 44 (e.g., ducting, tubing, etc.).

The turbine 40 is onboard the second stage rocket 12 and includes an inlet 46, a shaft 48, and an outlet 50. The inlet 46 receives the heated fluid that is output from the heat exchanger 38 via a primary heated fluid conduit 52 (e.g., ducting, tubing, etc.). In some embodiments, there will be an excess of energy in the heated fluid which will be bypassed around the turbine 40 via a bypass conduit 54 (e.g., ducting, tubing, etc.) and used to pressurize or power an auxiliary system 56 (e.g., a tank, a gas thruster, a transpiration cooling system, an auxiliary power unit (APU), etc.). The shaft 48 of the turbine 40 is coupled (e.g., directly coupled, indirectly coupled via a coupler, etc.) to the pump 16 and includes turbine blades (not shown) mounted thereon. The shaft 48 rotates and thereby powers the pump 16 when the heated fluid received from the heat exchanger 38 acts on the turbine blades (not shown). The outlet 50 of the turbine 40 outputs the heated fluid. In some embodiments, the second stage rocket 12 includes an exhaust conduit 58 through which the heated fluid exits the second stage rocket 12 (e.g., for providing thrust). Additionally or alternatively, the heated fluid output from the outlet 50 of the turbine 40 can be used to pressurize or power an auxiliary system (e.g., a tank, a gas thruster, a transpiration cooling system, an APU, etc.). The heated fluid that is output from the outlet 50 of the turbine 40 will have a pressure and energy that is less than that of the heated fluid diverted through the bypass conduit 54 to the auxiliary system 56. In some embodiments, the heat shield system 10 further includes bearings, gears, and/or seals (not shown) that facilitate the coupling of the turbine 40 and the pump 16 via the shaft 48.

During operation of the heat shield system 10, the pressurized coolant passes into the heat exchanger 38 (e.g., into channels or other conduits formed in the heat shield 34) and picks up heat 60 at a rate (i.e., a heat flux) that is typical of hypersonic and re-entry vehicles and may be in the range of 0.01-10 BTU/in²-s, for example. The heat exchanger 38 serves a dual purpose of cooling the windward side 22 of the second stage rocket 12, and adding energy to the coolant which is used to drive the turbine 40 and then power the pump 16. The pressure of the coolant drops while overall enthalpy increases along the heat exchanger 38, until the coolant exits the heat exchanger 38 as a heated fluid. The primary flow of heated fluid enters the turbine 40, where energy is extracted. The heated fluid exiting the turbine 40 is expelled out of the second stage rocket 12 into the external environment 14 or used for another purpose (e.g., re-chilled by onboard systems and passed back through the heat exchanger 38 in a closed loop cycle).

In some embodiments, the pressure of the coolant in the tank 36 alone provides enough energy to start spinning the turbine 40 and pump 16, creating an increasing pressure and increasing power available to the turbine 40. In other embodiments, the pressure of the coolant in the tank 36 does not provide enough energy to start spinning the turbine 40 and pump 16. In some such embodiments, the heat shield system 10 further includes an external starter source, such as a motor connected to the turbine shaft 48 or a high pressure gas directed at the turbine 40.

In some embodiments, at least one component (e.g., the tank 36, the pump 16, the turbine 40, etc.) is an already-existing component of the engine 32. For example, in some embodiments the engine 32 includes at least a pump and a turbine which push coolant through a heat exchanger of the engine. In such embodiments, the fuel pump and the turbine of the engine 32 serve dual-purposes by functioning as the pump 16 and the turbine 40 of the heat shield system 10, respectively, and the heat exchanger of the engine 32 forms at least a portion of the heat exchanger 38 of the heat shield system 10.

In some embodiments, the heat shield system 10 further includes at least one component that is additionally or alternatively cooled passively (e.g., using high temperature materials, etc.).

Once operation of the heat shield system 10 is started, thermal energy added to the coolant is enough to sustain operation. Specifically, the energy added to the coolant is enough to supply the turbine 40 with the required power to drive the pump 16 after taking into consideration all of the losses in the system 10, including pump 16 and turbine 40 inefficiencies, pressure losses in the heat exchanger 38, and other losses from friction and other mechanisms.

The coolant flowing through the heat exchanger 38 integrated into the windward side 22 of the second stage rocket 12 is enough to maintain acceptable temperatures on the heat shield 34 and other walls of the second stage rocket 12 while the second stage rocket 12 passes through the severe heat environment (e.g., while the second stage rocket 12 re-enters the atmosphere). The heat shield system 10 therefore enables the second stage rocket 12 to perform a base-first re-entry trajectory. This provides several key advantages over other proposed nose-first or body-first (a/k/a belly flop) strategies: (i) it eliminates the need for challenging in-atmosphere reorientation maneuver required for nose-first or body-first (a/k/a belly flop) re-entry vehicles with vertical landing profiles; (ii) it keeps the primary load paths in the axial direction during all phases of flight, allowing for a more efficient structural solution; (iii) the common vertical orientation during ascent and re-entry simplifies the cryogenic fluid management challenge by minimizing slosh and associated boil-off; and (iv) it minimizes the heat shield surface area while also maintaining a low ballistic coefficient, minimizing the overall heat load managed by the vehicle during re-entry.

While several embodiments have been disclosed, it will be apparent to those having ordinary skill in the art that aspects of the present invention include many more embodiments. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. An upper stage rocket of a multi-stage rocket system, the upper stage rocket comprising:
   a forward end;
   an aft end opposite the forward end;
   a propulsion engine at the aft end;
   an actively-cooled heat shield system including:
   a heat shield at the aft end and defining a windward side of the upper stage rocket during travel of the upper stage rocket in an atmospheric re-entry trajectory;
   a tank onboard the upper stage rocket, the tank configured to store a coolant;
   a pump onboard the upper stage rocket, the pump configured to receive the coolant from the tank and output a pressurized coolant;
   a heat exchanger onboard the upper stage rocket, the heat exchanger integrally connected with the heat shield and configured to receive the pressurized coolant from the pump, transfer heat from the heat shield to the pressurized coolant to generate a heated fluid, and output the heated fluid;

a turbine onboard the upper stage rocket, the turbine including:
  an inlet configured to receive the heated fluid output from the heat exchanger;
  a shaft coupled to the pump and including turbine blades mounted thereon, the shaft configured to rotate and thereby power the pump when the heated fluid received from the heat exchanger acts on the turbine blades; and
  an outlet configured to output the heated fluid.

2. The upper stage rocket of claim 1, wherein at least the heat exchanger, the turbine, and the pump are configured such that, once operation of the pump is started, an amount of energy supplied to the turbine from the heat exchanger is alone sufficient to continue operation of the pump.

3. The upper stage rocket of claim 1, wherein the heat shield is configured to be exposed to a high Mach number flow environment during normal operation.

4. The upper stage rocket of claim 1, wherein the heat shield system and the propulsion engine share a multi-purpose component; and
  wherein the multi-purpose component is at least one of the heat shield, the tank, the pump, the heat exchanger, and the turbine.

5. The upper stage rocket of claim 4, wherein the pump of the heat shield system is a fuel pump of the propulsion engine.

6. The upper stage rocket of claim 1, further comprising an exhaust conduit through which at least a portion of the heated fluid output from the turbine exits the upper stage rocket.

7. The upper stage rocket of claim 1, wherein the coolant is at least one of an active coolant, a liquid coolant, and a cryogenic coolant.

8. The upper stage rocket of claim 1, wherein the heated fluid is at least one of a gas and a supercritical fluid.

9. The upper stage rocket of claim 1, wherein the heat shield system further includes:
  a primary heated fluid conduit configured to transfer the heated fluid from the heat exchanger to the inlet of the turbine; and
  a bypass conduit configured to bypass, from at least a portion of the primary heated fluid conduit, an excess of energy in the heated fluid for power use by an auxiliary system.

10. The upper stage rocket of claim 9, wherein the auxiliary system is a tank.

11. The upper stage rocket of claim 9, wherein the auxiliary system is a gas thruster.

12. The upper stage rocket of claim 9, wherein the auxiliary system is a transpiration cooling system.

13. The upper stage rocket of claim 9, wherein the auxiliary system is an auxiliary power unit (APU).

14. The upper stage rocket of claim 1, further comprising an exhaust conduit through which at least a portion of the heated fluid output from the turbine exits the upper stage rocket; and
  wherein the exhaust conduit is at the aft end of the upper stage rocket.

15. The upper stage rocket of claim 1, wherein the pump of the heat shield system is a fuel pump of the propulsion engine; and
  wherein the heat shield system further includes:
    a primary heated fluid conduit configured to transfer the heated fluid from the heat exchanger to the inlet of the turbine; and
    a bypass conduit configured to bypass, from at least a portion of the primary heated fluid conduit, an excess of energy in the heated fluid for power use by an auxiliary system.

16. The upper stage rocket of claim 1, wherein the heat shield system and the propulsion engine share at least one multi-purpose component; and
  wherein the at least one multi-purpose component is the tank.

17. The upper stage rocket of claim 1, wherein the coolant is at least one of an active coolant, a liquid coolant, and a cryogenic coolant; and
  wherein the heated fluid is at least one of a gas and a supercritical fluid.

18. The upper stage rocket of claim 1, further comprising an exhaust conduit at the aft end of the upper stage rocket through which at least a portion of the heated fluid output from the turbine exits the upper stage rocket;
  wherein the pump of the heat shield system is a fuel pump of the propulsion engine; and
  wherein the heat shield system further includes:
    a primary heated fluid conduit configured to transfer the heated fluid from the heat exchanger to the inlet of the turbine; and
    a bypass conduit configured to bypass, from at least a portion of the primary heated fluid conduit, an excess of energy in the heated fluid for power use by an auxiliary system.

19. A method for actively cooling a windward side of an upper stage rocket of a multi-stage rocket system during atmospheric re-entry, comprising:
  initiating driving of a pump onboard the upper stage rocket to initiate output of a pressurized coolant from the pump;
  flowing the pressurized coolant output by the pump through a heat exchanger integrally connected with a heat shield that defines at least a portion of the windward side of the upper stage rocket;
  transferring heat from the heat shield to the pressurized coolant to generate a heated fluid;
  inputting the heated fluid to a turbine onboard the upper stage rocket, the turbine including a shaft coupled to the pump and turbine blades mounted to the shaft; and
  exposing the turbine blades to the heated fluid to drive the shaft and thereby continue driving the pump.

20. The method of claim 19, wherein the transferring and inputting steps supply an amount of energy to the turbine that is alone sufficient to continue driving the pump.

* * * * *